Feb. 25, 1936.  F. A. YOST  2,031,995
PASTRY COOKER
Filed March 7, 1935  3 Sheets-Sheet 1

Inventor
Frank A. Yost
By Clarence A. O'Brien
Attorney

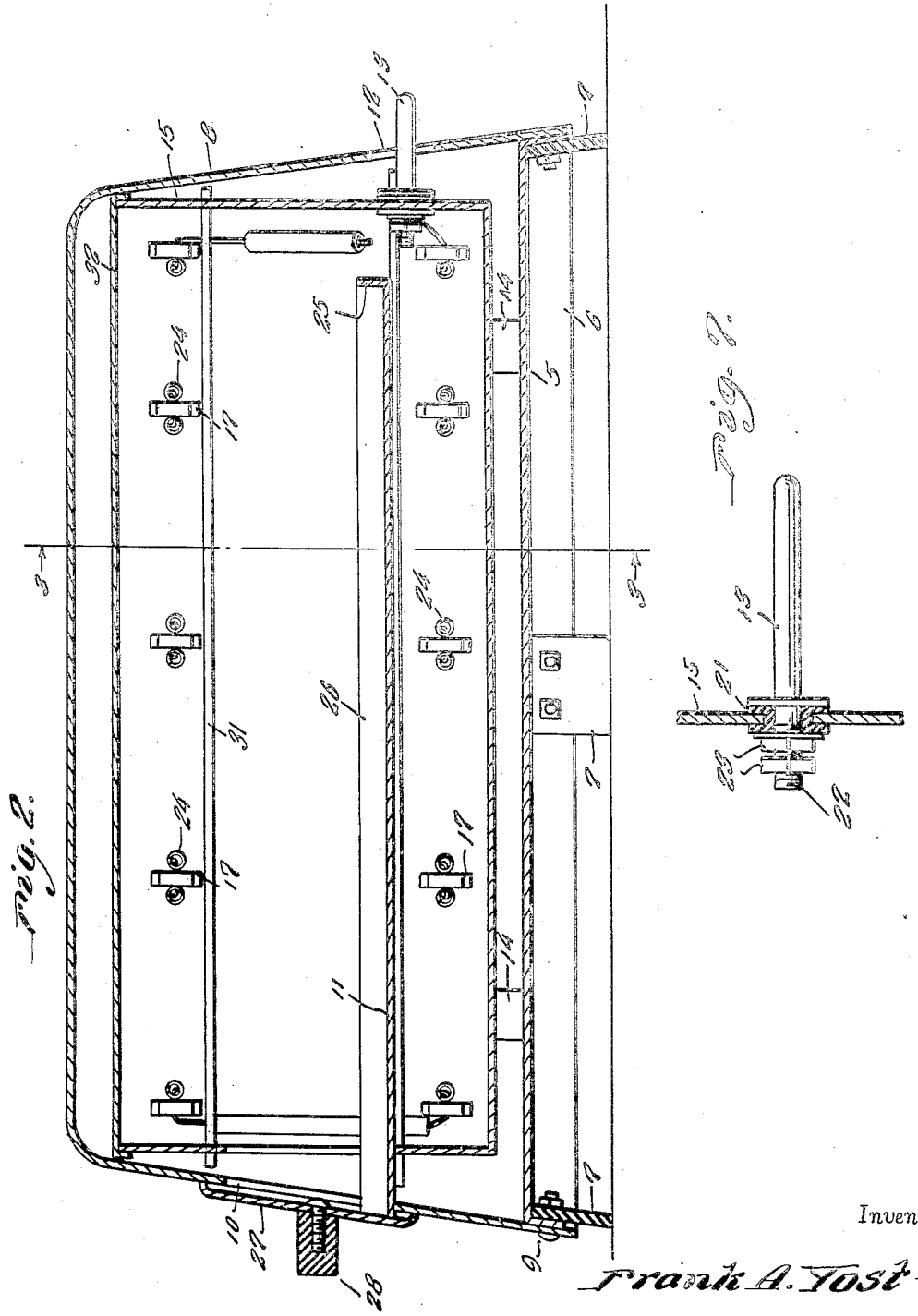

Feb. 25, 1936. F. A. YOST 2,031,995
PASTRY COOKER
Filed March 7, 1935 3 Sheets-Sheet 3
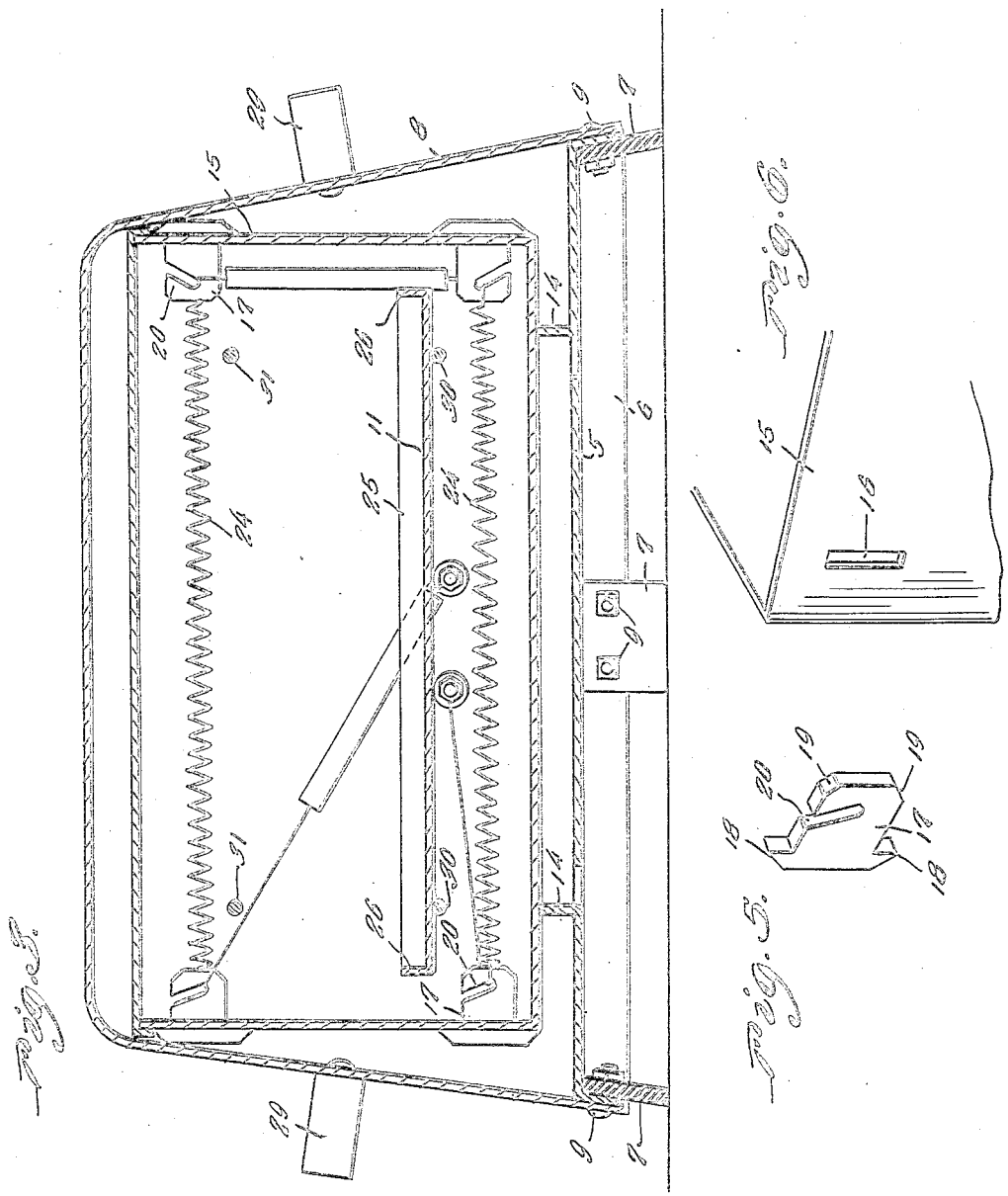
Inventor
Frank A. Yost
By Clarence A. O'Brien
Attorney Patented Feb. 25, 1936

2,031,995

UNITED STATES PATENT OFFICE 2,031,995

PASTRY COOKER

Frank A. Yost, Hopkinsville, Ky.

Application March 7, 1935, Serial No. 9,837

1 Claim. (Cl. 219—35)

This invention appertains to new and useful improvements in pastry baking apparatus and more particularly to a baker particularly adapted for cooking biscuits.

The principal object of the present invention is to provide a baking device for biscuits and like pastry which is of compact structure capable of being used in the portable manner in which electrical toasters, griddle irons and like utensils of the electrical type are now utilized.

Another important object of the invention is to provide a baking apparatus which will save considerably over the cost of fuel required in cooking biscuits and like pastry in gas ovens.

Another important object of the invention is to provide a portable pastry baker of such construction as to permit repair and replacement of parts with ease.

These and various other important objects and advantages of the invention will become apparent to the reader of the following specification.

In the drawings:

Figure 2 represents a vertical sectional view taken substantially on line 2—2 of Figure 1.

Figure 3 represents a cross sectional view taken substantially on line 3—3 of Figure 2.

Figure 5 represents a perspective view of one of the electrical heater element hangers.

Figure 6 represents a fragmentary perspective view of one corner portion of the oven.

Figure 7 represents a fragmentary detailed sectional view showing one of the connector prongs.

Figure 1:
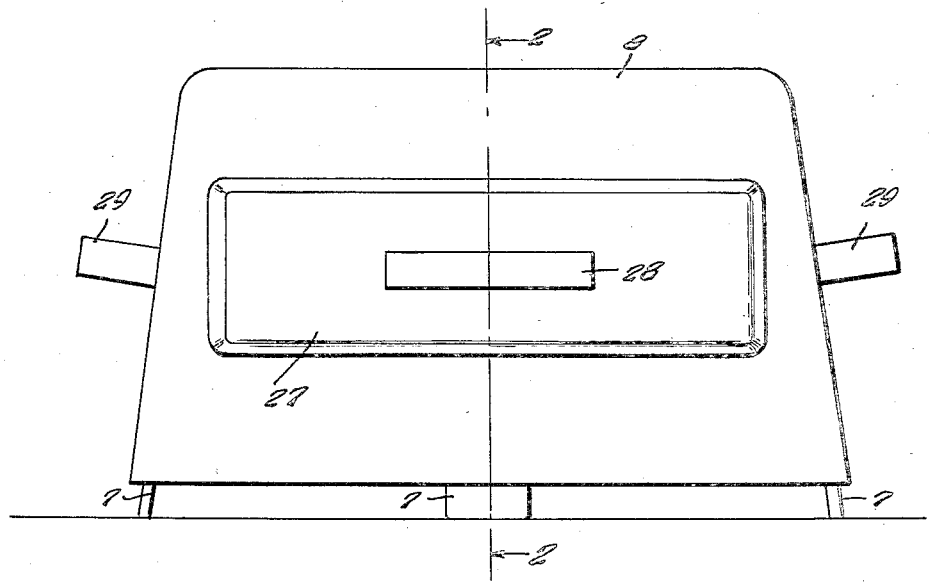
Figure 1 represents a front elevational view of the device.
Figure 4:
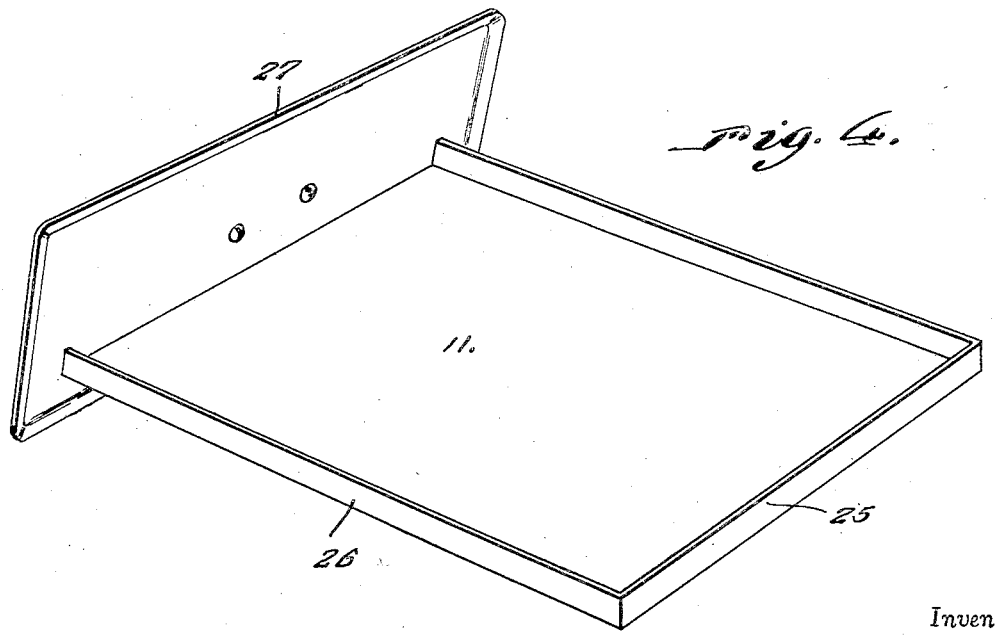
Figure 4 represents a perspective view of the tray.

Referring to the drawings wherein like numerals designate like parts, it can be seen that the numeral 5 represents the base provided with a depending perimetral flange at 6. Secured to this flange 6 is a plurality of leg members 7, each of suitable insulating material.

Numeral 8 represents a shell open at its bottom for snug disposition over the flanged perimeter of the base 5, the bolts 9 extending through the lower portion of this shell 8 and through the flange 6 and leg members 7 to secure these parts firmly together as shown in Figures 2 and 3.

One end of the shell 8 is provided with the opening 10 through which the tray 11 is insertable, while the opposite end of the shell 8 is provided with the opening 12 through which the connector prongs 13 protrude.

The bottom 5 is struck out to provide upstanding lugs 14 which support the oven 15, this oven being of substantially rectangular boxlike shape and provided on its opposite longitudinal side walls with rectangular-shaped vertical openings 16 into which can be inserted the electrical heating element hangers 17. These hangers each consist of a block of dielectric material of rectangular shape provided with upwardly and downwardly extending flanges 18 at its outer end, while the corners of its inner end are beveled off as at 19. Between the lugs 18 at the top of the block and the rear end of the block is a downwardly inclined slot 20.

Referring to Figure 7, it can be seen that each of the connector prongs 13 extends through a di-electric bushing 21 in the end wall of the oven 15, the inner end of the prong being threaded as at 22 to accommodate the nuts 23.

Numeral 24 represents the elongated heating element or coil, which is trained over the hangers 19 by being passed through the slots 20 therein, the ends of this heating element being connected to the inner threaded end portions 22 of the prongs 13 and being clamped between the nuts 23 on the said threaded end portion.

The tray 11 is provided with an upstanding end wall 25 at its inner end and upstanding side walls 26 at its longitudinal edge portions, while the outer end is provided with the closure plate 27 provided with the handle 28. This closure 27 serves to close the opening 10 in the shell 8 when the tray is in the position shown in Figure 2.

The side walls of the shell 8 are provided with handles 29 whereby the apparatus can be carried from place to place conveniently.

It can be seen that the rods 30 serve as supports for the tray 11, while the upper rods 31 serve as guards to prevent the tray from coming in contact with the heating element 24, in the event the tray is tilted when being inserted into the oven.

Moreover the top 32 of the oven 15 fits snugly in the shell 8 so as to prevent any shifting of the same on the base 5. In this manner the use of welding, soldering or rivets is eliminated.

While the foregoing specification sets forth the invention in specific terms, it is to be understood that numerous changes in the shape, size and materials may be resorted to without departing from the spirit and scope of the invention as claimed hereinafter.

Having thus described the invention what is claimed as new is:

A pastry cooker comprising a base, a shell secured to the base, an oven mounted within the shell, supporting blocks on the base, said blocks being adapted to support the oven, said shell being of upwardly converging construction and of a dimension to snugly engage at its side walls the upper edge portions of the oven when the shell is properly secured to the base.

FRANK A. YOST.